(12) United States Patent
Devadoss et al.

(10) Patent No.: US 11,546,475 B2
(45) Date of Patent: Jan. 3, 2023

(54) SYSTEM AND METHOD FOR DYNAMIC DRIVEN CONTEXT MANAGEMENT

(71) Applicant: MICRO FOCUS LLC, Santa Clara, CA (US)

(72) Inventors: Madan Gopal Devadoss, Bangalore (IN); Cherian Sebastian, Bangalore (IN)

(73) Assignee: MICRO FOCUS LLC, Santa Clara, CA (US)

(*) Notice: Subject to any disclaimer, the term of this patent is extended or adjusted under 35 U.S.C. 154(b) by 76 days.

(21) Appl. No.: 17/091,659

(22) Filed: Nov. 6, 2020

(65) Prior Publication Data

US 2022/0150362 A1 May 12, 2022

(51) Int. Cl.
  *H04L 12/28* (2006.01)
  *H04M 15/00* (2006.01)
  *G06N 20/00* (2019.01)
  *H04L 41/0893* (2022.01)
  *H04L 41/16* (2022.01)

(52) U.S. Cl.
  CPC ............ *H04M 15/66* (2013.01); *G06N 20/00* (2019.01); *H04L 41/0893* (2013.01); *H04L 41/16* (2013.01)

(58) Field of Classification Search
  CPC . G06N 20/00; H04L 41/0631; H04L 41/0893; H04L 41/16; H04L 43/08; H04L 43/0829; H04M 15/66; H04N 21/251; H04N 21/466; H04N 21/4662;
  (Continued)

(56) References Cited

U.S. PATENT DOCUMENTS 5,553,235 A * 9/1996 Chen ................... G06F 11/3414
                                                        714/E11.193
7,779,015 B2   8/2010 Abbott
                (Continued)

FOREIGN PATENT DOCUMENTS

CN          108476164 A       8/2018

OTHER PUBLICATIONS

Roh et al., A Survey on Data Collection for Machine Learning A Big Data—AI Integration Perspective, arXiv, 20 pages, Aug. 12, 2019.*
(Continued)

*Primary Examiner* — Frank Duong
(74) *Attorney, Agent, or Firm* — Michael Dryja

(57) ABSTRACT

Context information associated with a network node is determined. For example, a network node (e.g., a server) has indicated that an application on the network node appears to be having performance problems. The context information may be to gather data about the application, such as, load, number of users accessing the application, etc. The context information comprises one or more rules for dynamically configuring how data is collected on the node. For example, the rule may indicate what specific statistics should be gathered from the application in real-time. The context information is sent to the network node. Node information is received from the network node in response to sending the context information. The node information is collected based on the one or more rules for configuring how data is collected on the network node. The node information is organized and is displayed on a user interface to a user.

20 Claims, 5 Drawing Sheets

(58) Field of Classification Search
CPC ..... H04N 21/4666; H04Q 2213/13343; H04Q 2213/13349; H04Q 2213/349
See application file for complete search history.

(56) References Cited

U.S. PATENT DOCUMENTS

| | | | |
|---|---|---|---|
| 7,877,368 B2 | 1/2011 | Waters | |
| 8,144,850 B2 | 3/2012 | Brown | |
| 8,346,743 B2 * | 1/2013 | Pfuntner | G06F 11/3058 |
| | | | 707/702 |
| 9,213,941 B2 | 12/2015 | Petersen | |
| 9,330,165 B2 | 5/2016 | Jiang | |
| 9,929,915 B2 * | 3/2018 | Erickson | H04L 41/145 |
| 10,291,493 B1 * | 5/2019 | Rustad | H04L 43/045 |
| 10,454,955 B2 | 10/2019 | Schulman | |
| 10,649,885 B2 | 5/2020 | Rakshit | |
| 10,666,668 B2 | 5/2020 | Muddu | |
| 2006/0007901 A1 * | 1/2006 | Roskowski | H04W 24/00 |
| | | | 370/338 |
| 2007/0168505 A1 * | 7/2007 | Devadoss | H04L 43/08 |
| | | | 709/224 |
| 2007/0299631 A1 | 12/2007 | Macbeth | |
| 2012/0233216 A1 | 9/2012 | Lim | |
| 2018/0288063 A1 * | 10/2018 | Koottayi | G06F 15/76 |
| 2020/0201699 A1 | 6/2020 | Yu | |
| 2021/0008456 A1 * | 1/2021 | Somers | A63F 13/69 |
| 2021/0026720 A1 * | 1/2021 | Jain | G06F 11/0787 |

OTHER PUBLICATIONS

Amazon; Amazon Cloudwatch Features; Getting Started With Amazon Kinesis; AWS Builders Online Series;Aug. 27, 2020; 8 pages.
Azure; Azure Monitor for Containers Overview; May 21, 2020; 5 Pages.
Newman; Logging Tips for Power Users; Contextual Logging; Solarwinds, https://www.loggly.com; Feb. 17, 2016; 12 pages.

* cited by examiner

SYSTEM AND METHOD FOR DYNAMIC DRIVEN CONTEXT MANAGEMENT

FIELD

The disclosure relates generally to operations management and particularly to dynamic operations management.

BACKGROUND

Today's operations management systems are centrally managed systems that gather information from various devices on a network. The gathered information is then stored in a centrally managed database. If a user want to view specific information, the user has to setup specific filters and sifts through large amounts of data. This can result in missing key information associated with events and also can cause degraded database access and network performance due to the large amount of data being sent/stored.

SUMMARY

These and other needs are addressed by the various embodiments and configurations of the present disclosure. Context information associated with a network node is determined. For example, a network node (e.g., a server) has indicated that an application on the network node appears to be having performance problems. The context information may be to gather data about the application, such as, load, number of users accessing the application, etc. The context information comprises one or more rules for dynamically configuring how data is collected on the node. For example, the rule may indicate what specific statistics should be gathered from the application in real-time. The context information is sent to the network node. Node information is received from the network node in response to sending the context information. The node information is collected based on the one or more rules for configuring how data is collected on the network node. The node information is organized and is displayed on a user interface to a user.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "real-time" as used herein when referring to accessing and collecting information from a network node is accomplished by a microprocessor or computer without requiring human intervention. For example, the configuration of multiple network nodes and then collecting the configured information in real-time via a computer network is something that done automatically without human intervention. By configuring and collecting information in real-time, the computer network (e.g., devices on the computer network) can be managed much more efficiently than has been done previously.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6, Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
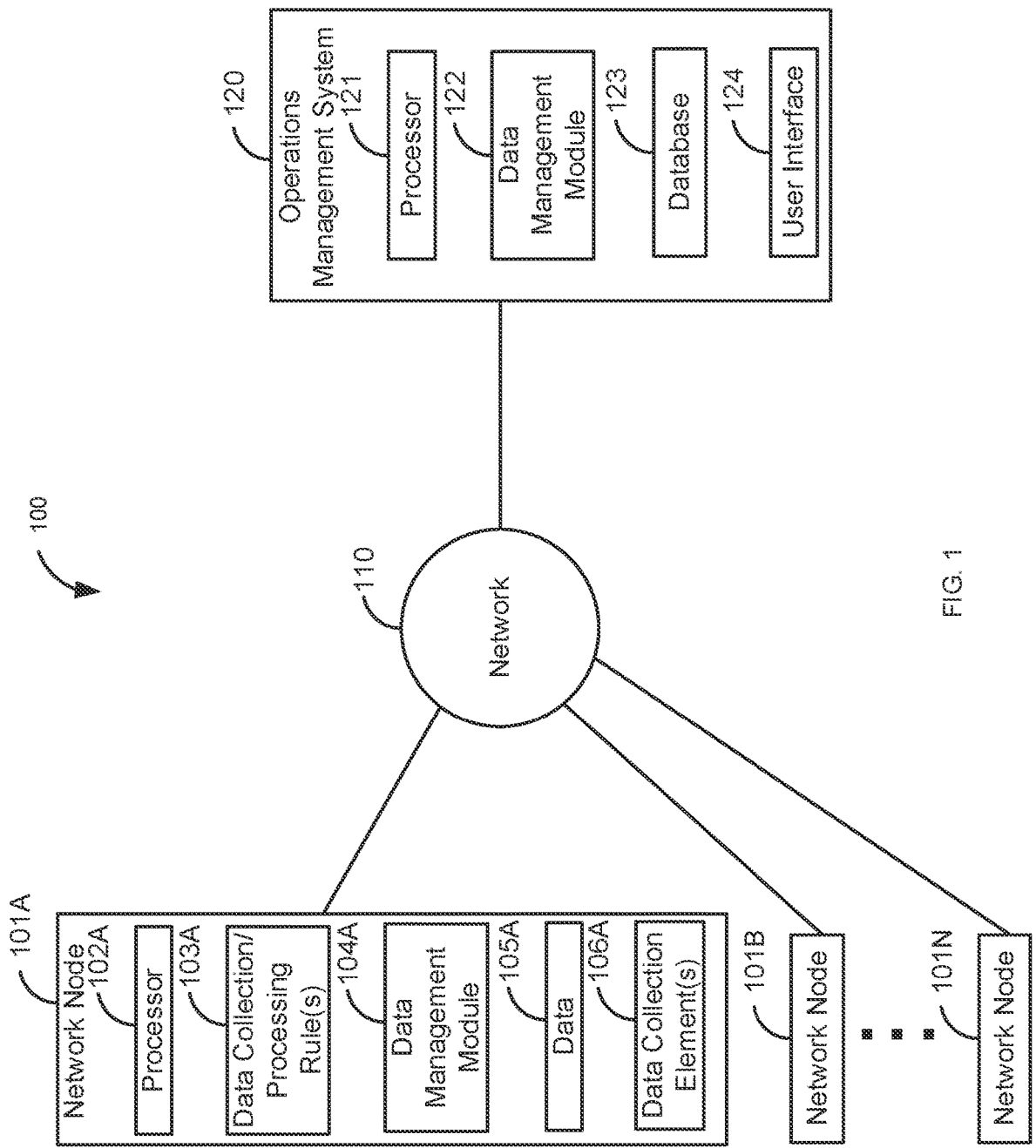
FIG. 1 is a block diagram of a first illustrative system for dynamically managing network nodes based on context.

FIG. 1 is a block diagram of a first illustrative system 100 for dynamically managing network nodes 101A-101N based on context. The first illustrative system 100 comprises the network nodes 101A-101N, a network 110, and an operations management system (OMS) system 120. The network nodes 101A-101N, may be any device that can reside on the network 110, such as, a Personal Computer (PC), a laptop computer, a tablet device, a smartphone, a server, a router, a bridge, a gateway, a firewall, a database server, a web server, an authentication server, a media server, a video server, a sensor, a printer, a scanner, a video camera, a light, a door control, a security system, a smoke detector, an air conditioner/heating controller, a Private Branch Exchange (PBX), a communication system, a network analyzer, a microphone, and/or the like. As shown in FIG. 1, any number of network nodes 101A-101N may be connected to the network 110, including only a single network node 101A.

The network node 101A further comprises a processor 102A, data collection/processing rules 103A, a data management module 104A, data 105A, and data collection elements 106A. Although not shown for simplicity, the network nodes 101B-101N may also comprise elements 102-106. For example, network node 101B may comprise elements 102B-106B and the network node 101N may comprise elements 102N-106N.

The processor 102A can be any kind of processor, such as, a microprocessor, a microcontroller, a multicore microprocessor, an application specific processor, and/or the like. The processor 102A may comprise multiple processors 102.

The data collection/processing rule(s) 103A may comprise one or more rules that define how data 105A is collected on the network node 101A. The data collection/processing rules 103A, may be based on various types of context, such as, a tenant identifier (e.g., a user or owner of: the network node 101A), a log file, a specific parameter in the log file, a type of service/application to monitor, a generated event, a transaction, an authentication, a login, starting/removing of a computer thread/process, an anomaly, an alarm, a status/change in status, exceeding a threshold, a Key Performance Indicator (KPI), a value, an hierarchical tree of parameters associated with a status/event (e.g., an alarm of security server and the hierarchal tree of parameters may be parameters associated with a user, such as, login time, login location, attempts to login, etc.), correlated events (e.g., simultaneous/serial attacks on different servers), context between network nodes 101, and/or the like. The data collection/processing rules 103A may define how a network node 101 filters/organizes/manages the collected data 105A based on the context. The data collection/processing rules 103A may be dynamically sent to the network node 101A based on a selected context that is sent from the operations management system 120.

The data management module 104A can be or may include any software/hardware that can manage how data 105A is collected by the network node 101A. The data management module 104A can manage collection/processing of the data 105A based on the data collection/processing rules 103A. The data management module 104A can manage the data 105A by dynamically disabling and/or enabling one or more data collection elements 106A in the network node 101A. For example, the data management module 104A may dynamically disable data collection by a network analyzer, a router, a sensor, an application, a computer thread, an interrupt service routine, etc. The data management module 104A may dynamically filter data 105A collected by the data collection element(s) 106 in real-time.

The data 105A can be or may include any type of data 105A that can be gathered/managed by the network node 101A. The data 105A may be stored, filtered, deleted, transmitted, encrypted, compressed, and/or the like based on the data collection/processing rules 103A. Although not shown, the data 105A may be stored in a database or memory.

The data collection element(s) 106A may be software and/or hardware elements. A data collection element 106A can be, or may include, a sensor, a network analyzer, a switch, an application, a status element (e.g., a printer ink level sensor), a thread, a process, a function call, a device, an authentication process, a database connector, a status indicator, an event processing routine, a configuration system, a threshold routine, a correlation system, an anomaly detection service, a KPI manager, and/or the like.

The network 110 can be or may include any collection of communication equipment that can send and receive electronic communications, such as the Internet, a Wide Area Network (WAN), a Local Area Network (LAN), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Integrated Services Digital Network (ISDN), Hyper Text Markup Language (HTML), Web Real-Time Communication (RTC) protocol, and/or the like. Thus, the network 110 is an electronic communication network configured to carry messages via packets and/or circuit switched communications.

The operations management system 120 can be or may include any hardware/software that can manage the network nodes 101A-101N, such as, a network operations center.

While shown as a single element, the operations management system 120 may be distributed across the network 110. The operations management system 120 further comprises a processor 121, a data management module 122, a database 123, and a user interface 124.

The processor 121 can be a processor 121 like the processor 102A. The processor 121 may comprise multiple processors 121 or may be multiple processors 121 in a distributed environment.

The data management module 122 is a module that manages how the network nodes 101A-101N collect, filter, store, and/or send the data 105A-105N. The data management module 122 may be in a single operations management system 122 or may be distributed across multiple operations management systems 120. The data management module 122 may be on a hierarchical operations management system 120. The data management module 122 can dynamically configure the network nodes 101A-101N by sending different data collection/processing rules 103A-103N to the network nodes 101A-101N. The data management module 122 may dynamically configure the network nodes 101A-101N by sending similar data collection/processing rules 103A-103N in real-time to each network node 101A-101N or by sending different data collection/processing rules 103A-103N in real-time to different network nodes 101A-101N. The data collection/processing rules 103A-103N may be different based on a type of the network node 101A-101N. For example, the data collection/processing rules 103A-103N may be different for a printer versus a load balancing application.

The database 123 can be, or may include, any type of database 123 that can store the data 105A-105N received from the network nodes 101A-101N, such as, a relational database, an SQL database, a JDBC database, a directory service, a distributed database, a file system, and/or the like. The database 123 may comprise multiple databases 123 that may be distributed across the network 110.

The user interface 124 may be any kind of user interface 124 that allows a user to interact with the operations management system 120. The user interface 124 may comprise one or more input/output devices, such as, a display, a mouse, a microphone, a touch screen, a keyboard, a camera, a biometric device, and/or the like. Although not shown, the operations management system 120 may comprise a web server that can be used to provide the user interface 124 via another device, such as a personal computer.

Figure 2:
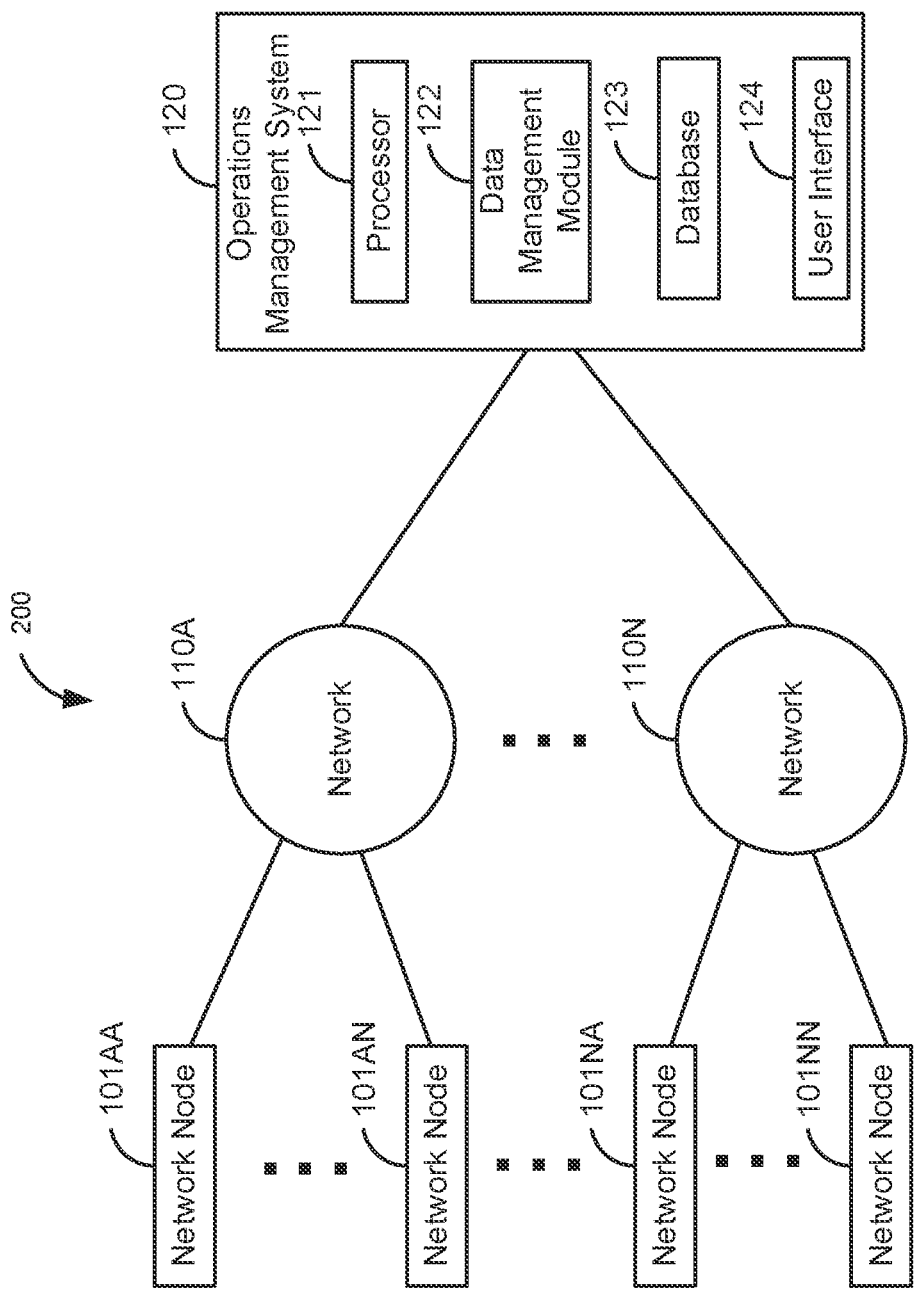
FIG. 2 is a block diagram of a second illustrative system for dynamically managing network nodes across multiple networks based on context.

FIG. 2 is a block diagram of a second illustrative system 200 for dynamically managing network nodes 101AA-101AN/101NA-101NN across multiple networks 110A-110N based on context. The second illustrative system 200 comprises network nodes 101AA-101AN, network nodes 101NA-101NN, networks 101A-101N, and the operations management system 120. In FIG. 2, the network nodes 101AA-101AN and 101NA-101NN, the networks 110A-110N, and the operations management system 120 may be similar to or different from the network nodes 101A-101N, the network 110, and the operations management system 120.

In this exemplary embodiment, the network nodes 101AA-101AN are associated with the network 110A and the network nodes 101NA-101NN are associated with the network 110N. For example, the network 110A/network nodes 101AA-101AN may be associated with one tenant (e.g., a first corporate network) and the network 110N/network nodes 101NA-101NN may be associated with a second tenant (e.g., a second corporate network). In this example, the operations management system 120 may provide cloud operations management services for managing the networks 110A-110N. In this example, there may be more than two networks 110A-110N.

Figure 3:
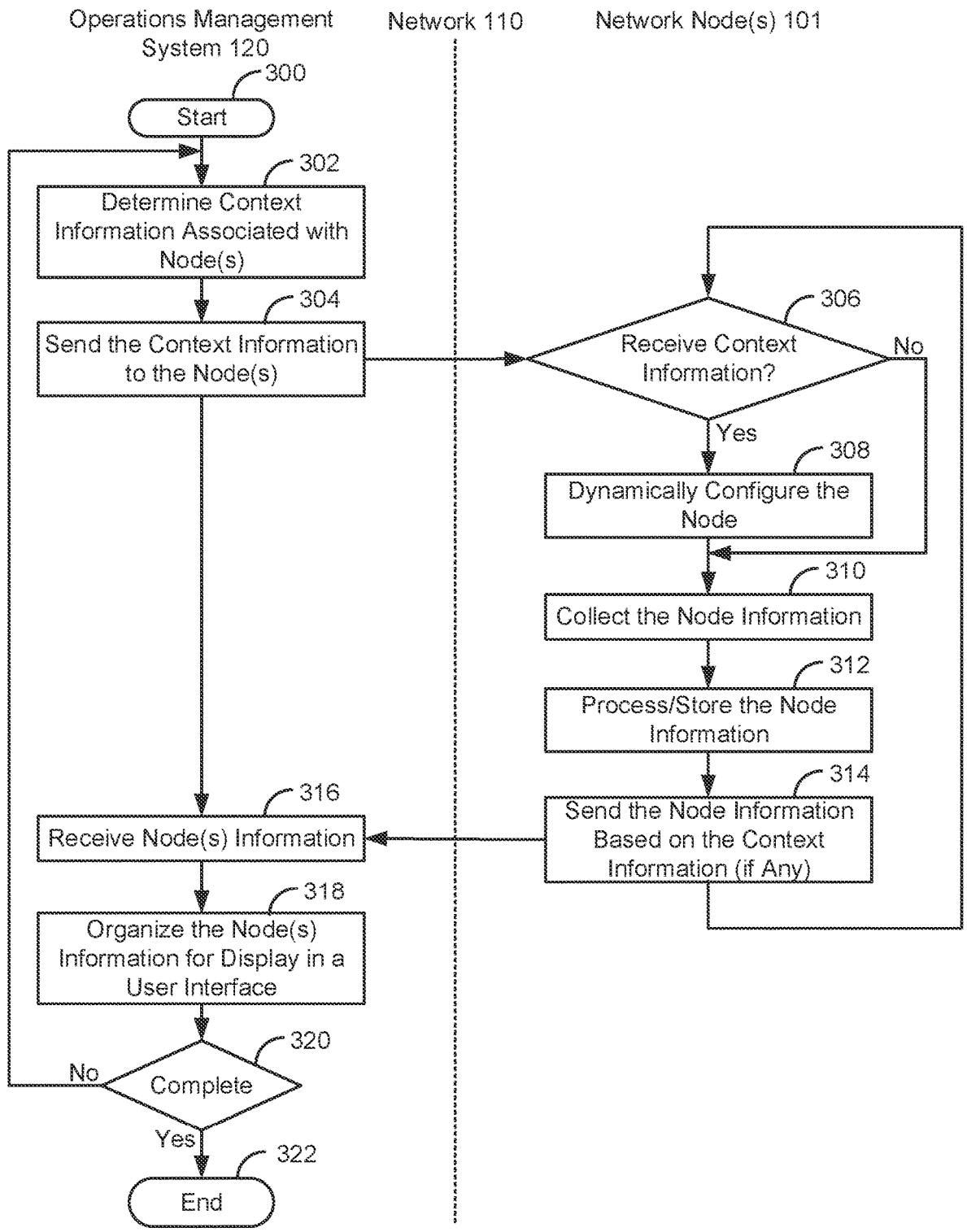
FIG. 3 is a flow diagram of a process for dynamically managing network nodes based on context.
Figure 4:
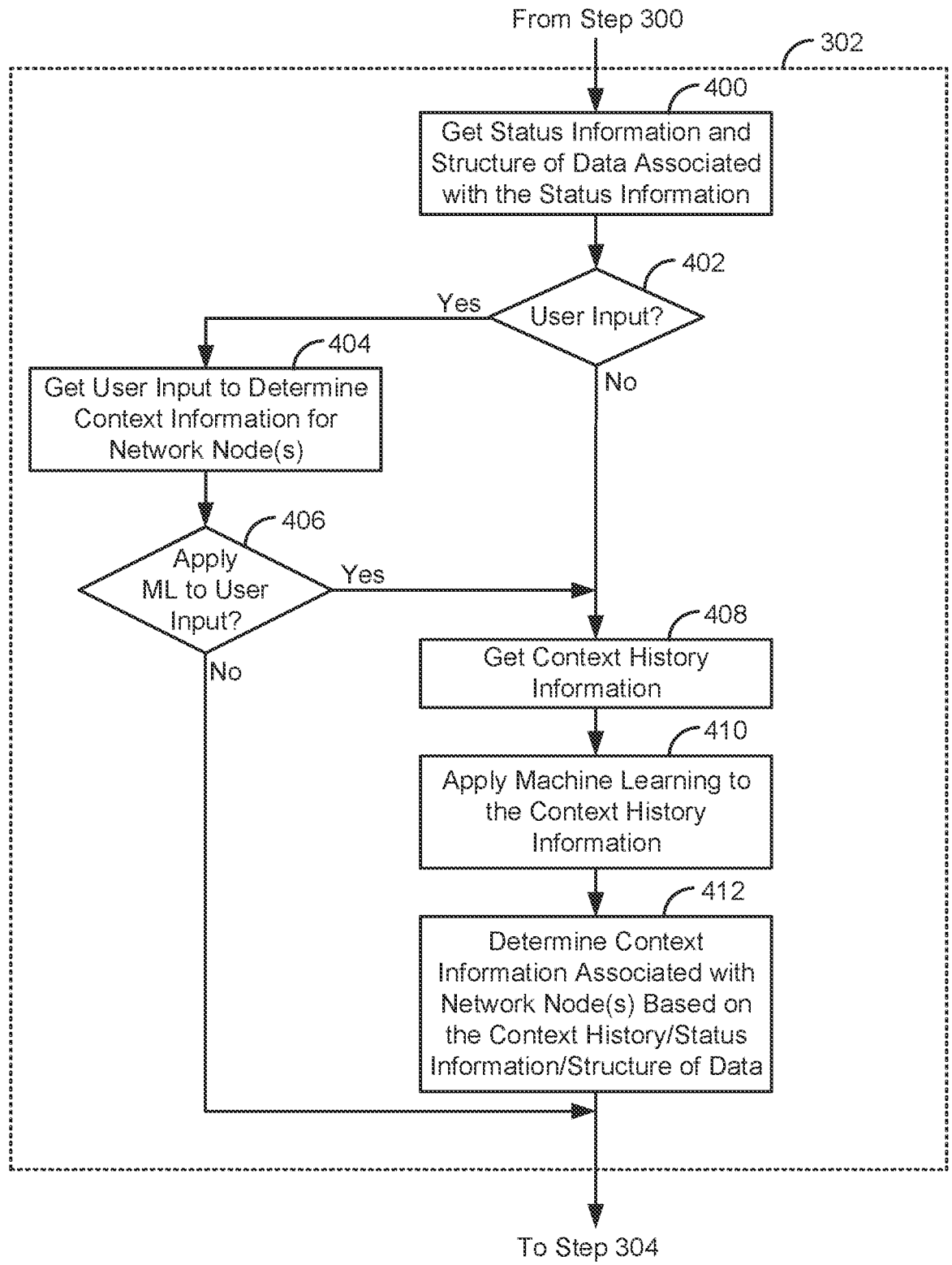
FIG. 4 is a flow diagram of a process for receiving user input and/or applying machine learning to determine context for dynamically managing network nodes.
Figure 5:
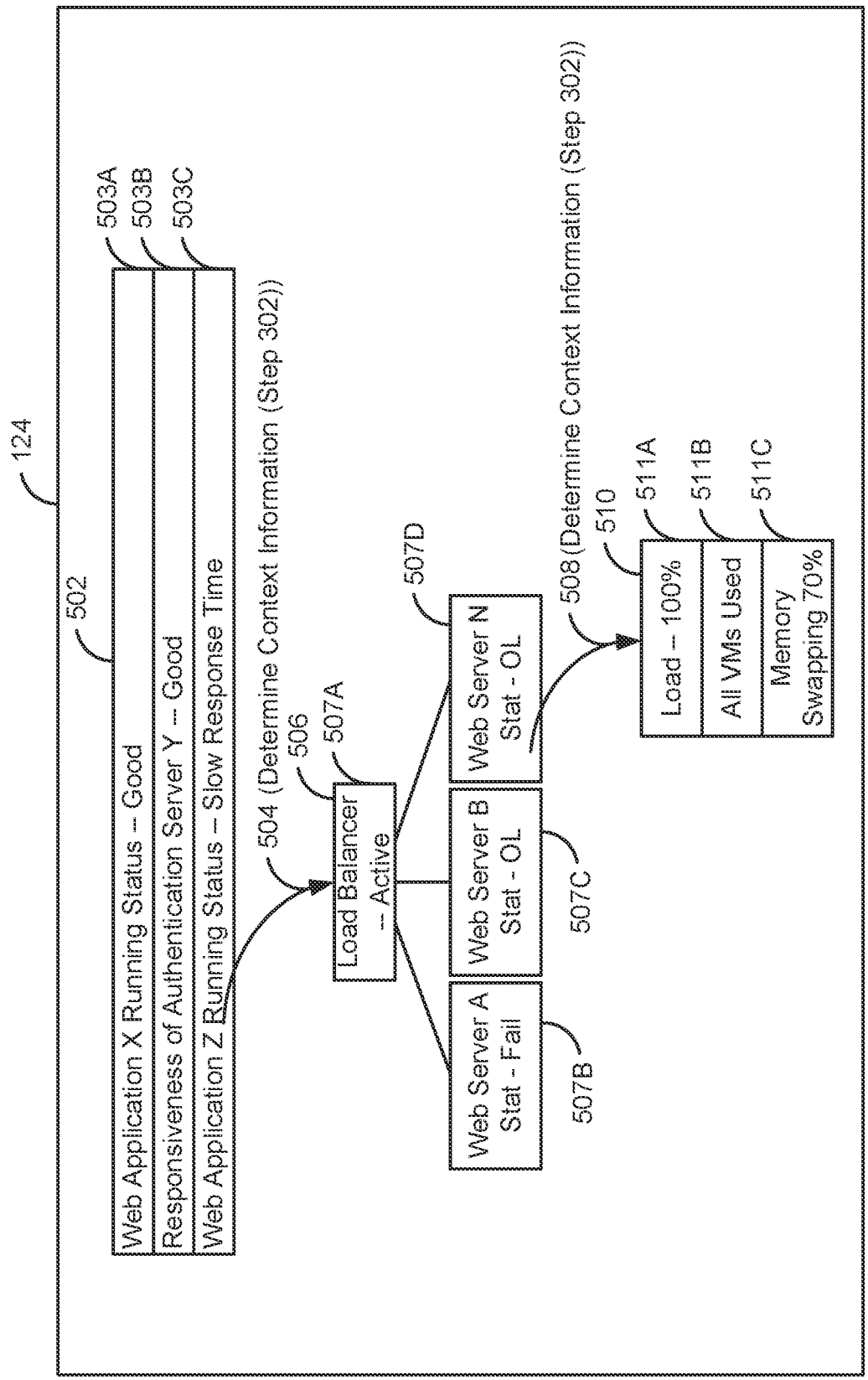
FIG. 5 is a diagram of a user interface that displays a hierarchical tree of parameters.

FIG. 3 is a flow diagram of a process for dynamically managing network node(s) 101 based on context. Illustratively, the network nodes 101A-101N, 101AA-101AN, and 101NA-101NN, and the operations management system 120 are stored-program-controlled entities, such as a computer or processor 103/121, which performs the method of FIGS. 3-5 and the processes described herein by executing program instructions stored in a computer readable storage medium, such as a memory (e.g., a computer memory, a hard disk, and/or the like). Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

FIG. 3 is a flow diagram that is partitioned based on the element performing each step. In FIG. 3, some of the steps use the network 110 to send and receive information. The steps on the left side of FIG. 3 are performed by the operations management system 120 and the steps on the right side of FIG. 3 are performed by the network node(s) 101.

The process starts in step 300. In step 302, the data management module 122 determines context information associated with the network nodes 101. The context information is based on a context of what information the operations management system 120 wants to dynamically manage in real-time. The context information may be derived from a discovery process that gathers topology information (e.g., a structure of the data 105) for each of the network nodes 101, such as tenant information, hardware elements (e.g., processor type, number of hard disks, memory amount), running applications, status (e.g., health of a device/application), number of instances of an application, and/or the like. The discovery of topology information allows the operations management system 120 to learn relationships between the network nodes 101 and the applications running on the network nodes 101. For example, the context information may be a specific tenant and the determined context information of step 302 may be information associated with the specific tenant on the network node 101. The context information may be KPIs of a quality of service of data being sent across the network 110. In this example, the network nodes 101 could be routers that send packets for the tenant across the network 110 according to the KPIs.

The operations management system 120 sends, in step 304, the context information to the network node(s) 101 (i.e., the data collection/processing rules 103). For example, the context information is a set of rules that tell the network node(s) 101 how to collect/filter information associated with the KPIs (e.g., packet loss). The network node 101 determines, in step 306, if the context information has been received. In this example, the context information has been received and the network node 101 dynamically configures itself according to the rules on how to collect/filter the node information in step 308. For example, the network node 101 starts capturing packet statistics in real-time as packets are routed in the network 110. If the network node 101 does not receive the context information in step 306, the process goes to step 310.

The network node 101 collects the node information according the data collection/processing rules 103 in step 310. The node information is then processed and stored in step 312. For example, the node information may be processed by filtering the node information according to the data collection/processing rules 103. The node information may be stored in a database or memory on the network node 101. The network node 101 then sends the node information (based on the data collection/processing rules 103), in step 314, to the operations management system 120.

The process then goes back to step 306. The process of steps 306-314 then repeats. For example, if new context information is received in step 306, the process of steps 308-314 repeats. If no new/additional context information is received in step 306, the processes of steps 310-314 repeat. This way the network node 101 can be dynamically configured and continually send node information based to the context information sent by the operations management system 120 in real-time.

The process of step 306-314 may be done in multiple network nodes 101 in parallel based on the operations management system 120 sending context information (the same or different) to multiple network nodes (e.g., network nodes 101A-101N) at the same time. This way, the operations management system 120 can manage any number of network nodes (e.g., 101A-101N, 101AA-101AN-101NA-101NN) simultaneously.

The operations management system 120 (i.e., the data management module 122) receives the node information in step 316. The operations management system 120 (i.e., the data management module 122) then organizes the node information for display in the user interface 124 in step 318. The operations management system 120 may organize the node information in various ways, such as, based on a hierarchical tree of parameters associated with a status of the network node 101, based on multiple tenants, based on multiple networks 110, based on the context information, and/or the like. For example, if the context information is displayed as a hierarchical tree, the hierarchical tree may be a number of parameters that clarifies the status of the network node 101 in real-time. The hierarchical tree may be parameters that are displayed in a similar manner as shown in FIG. 5.

The process determines, in step 320, if the process is complete. If the process is complete in step 320, the process ends in step 322. Otherwise, if the process is not complete in step 320, the process goes back to step 302.

To further illustrate the process of FIG. 3, consider another illustrative example. The operations management system 120 determines that web server A of Corporation X is experiencing a delay in executing some of its monitoring scripts. Normally, what would be displayed to the administrator of the operations management system 120 would be a log message that says "The monitoring scripts A-B of web server A are running slow." Based on this event, the operations management system 120 determines, based on the context information (step 302), that there are additional parameters/information that are associated with scripts A-B. In this example, the operations management system 120 determines the following additional information/parameters may be relevant to the user: 1) business impact, 2) nature of the impact, 3) technical reason, 4) an email contact of who can currently handle the problem, 5) a phone number of the contact who can currently handle the problem, and 6) who the problem may be addressed to in real-time. Based on the determined context information, the operations management system 120 sends a message to the network node 101 (web server A), in step 304, where the message defines one or more rules (the data collection/processing rules 103) for configuring the network node 101 (web server A) on how to collect/filter the necessary node information. The operations management system 120 may also get some of the information from the database 123 (a local network node 101). The network node 101 (web server A) receives the one or more rules in step 306. The network node 101 dynamically configures itself according to the rules (step 308) and then collects the node information (step 310). In this example, the collected node information is: 1) Business Impact: "East European Mirror Site", 2) Nature of Impact: "Health Status Not Current", 3) Technical Reason: "Monitoring Scripts Running Slow", 4) E-mail Contact: sysadmin@easteurope.corporationx.com, 5) Phone number: 123-456-7890, and 6: ATTN-Shift: Graveyard Shift". The network node 101 (web server A) processes and stores the node information (step 312). The network node 101 (web server A) sends the node information based on the context information (step 314). The operations management system 120 receives the node information (step 316). The operations management system 120 then organizes the node information for display in the user interface 124 (step 318). In this example, the following log message is displayed in step 318: "Business Impact: "East European Mirror Site," Nature of Impact: 'Health Status Not Current," Technical Reason: "Monitoring Scripts Running Slow," E-mail Contact: sysadmin@easteurope.corporationx.com, Phone number: 123-456-7890, ATTN-Shift: Graveyard Shift." The primary advantage here is that the user is dynamically provided the key information to quickly make a proper decision on how to handle the event. With current systems, it usually takes much more time to retrieve and display the node information.

FIG. 4 is a flow diagram of a process for receiving user input and/or applying machine learning to determine context information for dynamically managing network nodes 101. The process of FIG. 4 is an exemplary embodiment of step 302.

After starting in step 300, the data management module 122 gets status information and the structure of data (e.g., data 105A) associated with the status information in step 400. The status information can be, or may include, many different kinds of status information, such as, an alarm, an update, a change in status, a parameter, a notification, detection of an anomaly, and/or the like. The structure of the data 105 associated with the status information may be one or more variables/parameters associated with the status. For example, the status may be an authentication alert and the variables may be the user name, time, location, and device ID. The structure of the data 105 associated with the status information may be a hierarchical structure of data 105 associated with the status information (e.g., as described in FIG. 5). For example, a hierarchical structure may be a structure of a network of devices or services.

The process determines, in step 402, if user input is going to be used to determine the context information associated with the network node(s) 101. If user input is going to be used to help determine the context information associated with the network node(s) 101, the process gets the user input in step 404. The process determines, in step 406, if machine learning is going to be applied to the user input. If machine learning is not going to be applied to the user input in step 406, the process goes to step 304.

If machine learning is going to be applied to the user input in step 406 or if user input is not going to be used in step 402, the process gets, in step 408, context history information. Context history information can be any type of information that is gathered about a network node 101, such as, previous setting on the network node 101, previous user configurations, detection of anomalies, network node events, cross node events, applications running on the network node 101, information associated with the application(s) running on the network node 101, sensor(s) in the network node 101, and/or the like. The context history information may be historical information from the same network node 101 or may come from different network nodes 101. For example, the context history information may come from a different network nodes 101 on different corporate networks 110. The operations management system 120 applies the machine learning, in step 410 to the context history information. The type of machine learning may be supervised machine learning, unsupervised machine learning, reinforced machine learning, and/or the like.

The operations management system 120 determines context information associated with the network node(s) 101 based on the context history, status information, and/or the structure of the data 105 in step 412. For example, the operations management system 120 may apply unsupervised machine learning to identify an anomalous event on the network node 101. The operations management system 120 can then use the anomalous event to identify additional status information/data 105 that will help a user gather information about the anomalous event in step 412. For example, the status information/data 105 may include a time of the anomaly, a user associated with the anomaly, a device associated with the anomaly, and/or the like. The process then goes to step 304.

FIG. 5 is a diagram of a user interface 124 that displays a hierarchical tree of parameters 506. The user interface 124 comprises a list statuses 502, the hierarchical tree of parameters 506, and a list of parameters 510.

The list of statuses 502 comprise three items: 1) a status of Web Application X (503A), a responsiveness status of Authentication Server Y (503B), and a running status of Web Application Z (503C). In this example, the status of Web Application X is good. The responsiveness status of Authentication Server Y is good. The running status of the Web Application Z is "Slow Response Time." The list of statuses 502 may be created based on events that occur in real-time. For example, a new item in the list of statuses 502 may be dynamically added in real-time based on an event, such as, an alarm, crossing a threshold, a change in status, a failure indication, and/or the like.

In the user interface 124, the user may select an item 503A-503C from the list of statuses 502 to get additional node information. For example, as shown in FIG. 5, the user has clicked, in step 504, on the item 503C (running status of the Web Application Z) in the list of statuses 502. When the user clicks on the item 503C (running status of the Web Application Z), in step 504, the operations management system 120 determines the context information in step 302 (e.g., as described in FIG. 4 based on machine learning and/or user input). In this example, the operations management system 120 sends the context information to the network nodes 101 that are related to the Web Application Z running status (e.g., the Load Balancer, the Web Server A, the Web Server B, and the Web Server N). This results in the receipt of the node information (step 316) from the network nodes 101 (the Load Balancer, the Web Server A, the Web Server B, and the Web Server N). The hierarchical tree of parameters 506 is displayed to the user (step 318) along the status of each of the network nodes 101 (the Load Balancer, the Web Server A, the Web Server B, and the Web Server N).

The hierarchical tree of parameters 506 comprises a Load Balancer icon 507A, a Web Server A icon 507B, a Web Server B icon 507C, and a Web Server N icon 507D. In this example, the Load Balancer icon 507A has a status of "Active." The Web Server A icon 507B has a status of "Fail." The Web Server B icon 507C has a status of overload. Likewise, the Web Server N icon 507D has a status of overload. In FIG. 5, the user can click on any of the icons 507A-507D and get specific node information from the respective network nodes 101. As shown in FIG. 5, it is clear that because Web Server A has failed, this is causing Web Servers B-N to be overloaded.

In step 508, the user has clicked on the Web Server N icon 507D. When the user clicks on the Web Server N icon 507D, in step 508, the operations management system 120 determines the context information in step 302 (e.g., as described in FIG. 4). In this example, the operations management system 120 sends the context information to the Web Server N (a network node 101) in step 304. This results in the Web Server N 101 sending the node information in step 314. The operations management system 120 receives the node information in step 316. The list of parameters 510 are then displayed in the user interface 124 (step 318). The list of parameters 510 comprises a load parameter 511A, a virtual machine status 511B, and a memory swapping status 511C. The load parameter 511A indicates that Web Server N is 100% loaded. The virtual machine status 511B indicates that all the virtual machines for Web Server N are being used. The memory swapping status 511C indicates that there is 70% memory swapping occurring in the Web Server N.

The process of FIG. 5 illustrates how node information can be dynamically gathered in real-time from the network nodes 101 and then displayed to a user. The process of FIG. 5 may be done in real-time based on machine learning. This this example, the network nodes 101 are dynamically configured in real-time and the node information is gathered in real-time automatically.

Alternatively, input may be received with or without machine learning to dynamically configure the network nodes 101 for receiving node information in real-time. For example, although not shown, the user may be displayed a window to provide input for configuring the network nodes 101.

The process of FIG. 5 describes of how a user can, upon demand, dynamically and in real-time configure the network nodes 101A-101N/101AA-101AN-101NA-101NN for data collection. FIG. 5 is an example, of a layered configuration process of where a user can bore down and get details of node information based on a hierarchical tree of parameters in real-time.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a processor; and
   a non-transitory computer readable medium, coupled with the processor and comprising processor readable and executable instructions that, when executed by the processor, cause the processor to:
      determine context information associated with a plurality of network nodes, wherein the context information comprises one or more rules for configuring how the network nodes are to collect data regarding the network nodes and wherein the network nodes are respectively on a plurality of different networks;
      respectively send the context information to the network nodes via the different networks;
      receive, from the network nodes, node information, wherein the node information is collected by the network nodes based on the one or more rules of the context information that the network nodes received; and
      organize the node information based on the received node information, wherein the organized node information is displayed on a user interface,
   wherein the context information sent to each network node comprises individual context information regarding a user or owner of the network node.

2. The system of claim 1, wherein the one or more rules dynamically disable one or more data collection elements in the network nodes.

3. The system of claim 1, wherein the one or more rules dynamically enable one or more data collection elements in the network nodes.

4. The system of claim 1, wherein the context information is based on machine learning.

5. The system of claim 4, wherein the machine learning is based on a history of the context information sent to the network nodes.

6. The system of claim 4, wherein the node information is based on hierarchical trees of parameters associated with statuses of the network nodes, and the hierarchical trees of parameters further clarify the statuses of the network nodes in real-time.

7. A method comprising:
   determining, by a processor, context information associated with a plurality of network nodes, wherein the context information comprises one or more rules for configuring how the network nodes are to collect data regarding the network nodes and wherein the network nodes are respectively on a plurality of different networks;
   respectively sending, by the processor, the context information to the network nodes via the different networks;
   receiving, by the processor, from the network nodes, node information, wherein the node information is collected by the network nodes based on the one or more rules of the context information that the network nodes received; and
   organizing, by the processor, the node information based on the received node information, wherein the organized node information is displayed on a user interface,
   wherein the context information is different for two or more of the network nodes,
   and wherein the one or more rules are different for the two or more of the network nodes.

8. The method of claim 7, wherein the context information is based on machine learning.

9. The method of claim 8, wherein the machine learning is based on a history of the context information sent to the network nodes.

10. The method of claim 8, wherein the node information is based on hierarchical trees of parameters associated with statuses of the network nodes, and the hierarchical trees of parameters further clarify the statuses of the network nodes in real-time.

11. The method of claim 7, wherein the one or more rules dynamically disable one or more data collection elements in the network nodes.

12. The method of claim 7, wherein the one or more rules dynamically enable one or more data collection elements in the network nodes.

13. A non-transitory computer readable medium having stored thereon instructions that cause a processor to execute a method, the instructions comprising:
   instructions to determine context information associated with a plurality of network nodes, wherein the context information comprises one or more rules for configuring how the network nodes are to collect data regarding the network nodes and wherein the network nodes are respectively on a plurality of different networks;
   instructions to respectively send the context information to the network nodes via the different networks;
   instructions to receive, from the network nodes, node information, wherein the node information is collected by the network nodes based on the one or more rules of the context information that the network nodes received; and
   instructions to organize the node information based on the received node information, wherein the organized node information is displayed on a user interface,
   whether either
      the context information sent to each network node comprises individual context information regarding a user or owner of the network node, or
      the context information is different for two or more of the network nodes and the one or more rules are different for the two or more of the network nodes.

14. The non-transitory computer-readable medium of claim 13, wherein the context information sent to each network node comprises the individual context information regarding the user or owner of the network node.

15. The non-transitory computer-readable medium of claim 13, wherein the context information is different for the two or more of the network nodes and the one or more rules are different for the two or more of the network nodes.

16. The non-transitory computer-readable medium of claim 13, wherein the one or more rules dynamically disable one or more data collection elements in the network nodes.

17. The non-transitory computer-readable medium of claim 13, wherein the one or more rules dynamically enable one or more data collection elements in the network nodes.

18. The non-transitory computer readable medium of claim 13, wherein the context information is based on machine learning.

19. The non-transitory computer readable medium of claim 18, wherein the context information is based on a history of the context information sent to the network nodes.

20. The non-transitory computer readable medium of claim 18, wherein the node information is based on hierarchical trees of parameters associated with statuses of the network nodes, and the hierarchical trees of parameters further clarify the statuses of the network nodes in real-time.

* * * * *